(12) United States Patent
Vesely et al.

(10) Patent No.: US 9,123,165 B2
(45) Date of Patent: Sep. 1, 2015

(54) SYSTEMS AND METHODS FOR 3D DATA BASED NAVIGATION USING A WATERSHED METHOD

(71) Applicant: Honeywell International Inc., Morristown, NJ (US)

(72) Inventors: Milos Vesely, Nemcice (CZ); Michal Dobes, Olomouc (CZ); Jan Lukas, Melnik (CZ); Yunqian Ma, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 304 days.

(21) Appl. No.: 13/745,893

(22) Filed: Jan. 21, 2013

(65) Prior Publication Data

US 2014/0204082 A1    Jul. 24, 2014

(51) Int. Cl.
G06K 9/00 (2006.01)
G06T 15/10 (2011.01)
G06T 7/00 (2006.01)
B64C 7/00 (2006.01)

(52) U.S. Cl.
CPC .............. G06T 15/10 (2013.01); G06T 7/0081 (2013.01); G06T 2207/10028 (2013.01); G06T 2207/20152 (2013.01); G06T 2207/30252 (2013.01)

(58) Field of Classification Search
USPC ......... 382/100, 103, 106–107, 140, 154, 162, 382/168, 173, 181, 199, 210, 232, 241, 254, 382/274, 276, 285–291, 305, 312, 321; 701/408, 10; 340/988
See application file for complete search history.

(56) References Cited

U.S. PATENT DOCUMENTS

| | | |
|---|---|---|
| 4,891,630 A | 1/1990 | Friedman et al. |
| 5,383,013 A | 1/1995 | Cox |
| 5,719,774 A | 2/1998 | Rao et al. |
| 5,751,406 A | 5/1998 | Nakazawa et al. |
| 5,870,490 A | 2/1999 | Takahashi et al. |
| 5,978,504 A | 11/1999 | Leger |

(Continued)

FOREIGN PATENT DOCUMENTS

| | | |
|---|---|---|
| EP | 2249311 | 11/2010 |
| GB | 2405776 | 3/2005 |
| WO | 0108098 | 2/2001 |

OTHER PUBLICATIONS

Soille et al., "Determining watersheds in digital pictures via flooding simulations", "Visual Communications and Image Processing '90", Oct. 1990, pp. 1-11, vol. 1360.*

(Continued)

Primary Examiner — Seyed Azarian
(74) Attorney, Agent, or Firm — Fogg & Powers LLC

(57) ABSTRACT

Systems and methods for 3D data based navigation using a watershed method are provided. In at least one embodiment, a method for segmenting three-dimensional frames of data comprises acquiring at least one frame from at least one sensor, wherein the at least one frame provides a three-dimensional description of an environment containing the at least one sensor; and identifying a surface in the at least one frame. The method further comprises computing at least one residual map for the at least one frame based on the orthogonal distance from data points on the surface to at least one polynomial surface fitted to the surface; and segmenting the at least one residual map by performing a watershed algorithm on the residual map.

19 Claims, 8 Drawing Sheets

(56) References Cited

U.S. PATENT DOCUMENTS

| | | | |
|---|---|---|---|
| 5,988,862 | A | 11/1999 | Kacyra et al. |
| 6,019,496 | A | 2/2000 | Rao et al. |
| 6,476,803 | B1 | 11/2002 | Zhang et al. |
| 6,693,962 | B1 | 2/2004 | Murching et al. |
| 6,724,383 | B1 | 4/2004 | Herken et al. |
| 6,911,995 | B2 | 6/2005 | Ivanov et al. |
| 6,956,503 | B2 * | 10/2005 | Yokokohji et al. ............ 340/988 |
| 6,956,573 | B1 | 10/2005 | Bergen et al. |
| 7,203,342 | B2 | 4/2007 | Pedersen |
| 7,215,810 | B2 | 5/2007 | Kaufmann et al. |
| 7,239,751 | B1 | 7/2007 | Amador |
| 7,436,988 | B2 | 10/2008 | Zhang et al. |
| 7,574,020 | B2 | 8/2009 | Shamaie |
| 7,639,896 | B2 | 12/2009 | Sun et al. |
| 7,643,966 | B2 | 1/2010 | Adachi et al. |
| 2003/0067461 | A1 | 4/2003 | Fletcher et al. |
| 2005/0271280 | A1 | 12/2005 | Farmer et al. |
| 2006/0188849 | A1 | 8/2006 | Shamaie |
| 2006/0233436 | A1 * | 10/2006 | Ma et al. ....................... 382/154 |
| 2007/0217682 | A1 | 9/2007 | Motomura et al. |
| 2007/0234230 | A1 | 10/2007 | Pedersen |
| 2008/0013836 | A1 | 1/2008 | Nakamura et al. |
| 2008/0095419 | A1 | 4/2008 | Volkau et al. |
| 2008/0123959 | A1 | 5/2008 | Ratner et al. |
| 2008/0167814 | A1 | 7/2008 | Samarasekera et al. |
| 2009/0310867 | A1 | 12/2009 | Matei et al. |
| 2010/0074473 | A1 | 3/2010 | Kotaba |
| 2010/0104199 | A1 | 4/2010 | Zhang et al. |
| 2010/0111370 | A1 | 5/2010 | Black et al. |
| 2010/0284572 | A1 * | 11/2010 | Lukas et al. .................. 382/107 |
| 2011/0249883 | A1 | 10/2011 | Can et al. |
| 2012/0027310 | A1 | 2/2012 | Lukas et al. |
| 2012/0033896 | A1 | 2/2012 | Barrows |
| 2012/0194517 | A1 | 8/2012 | Izadi et al. |
| 2012/0213440 | A1 | 8/2012 | Tappen et al. |
| 2013/0080045 | A1 * | 3/2013 | Ma et al. ....................... 701/408 |
| 2013/0080111 | A1 | 3/2013 | Dunik et al. |
| 2014/0204081 | A1 | 7/2014 | Dobes et al. |
| 2014/0204082 | A1 | 7/2014 | Vesely |

OTHER PUBLICATIONS

U.S. Patent and Trademark Office, "Final Office Action", "U.S. Appl. No. 13/242,701", Oct. 24, 2014.

European Patent Office, "Office Action from EP Application No. 14150388.8 mailed Nov. 11, 2014", "from Foreign Counterpart of U.S. Appl. No. 13/745,892", Nov. 11, 2014, pp. 1-9, Published in: EP.

Alhwarin et al., "VF-SIFT: Very Fast SIFT Feature Matching", 2010, pp. 222-231, Published in: DE.

Se et al., "Vision-Based Mobile Robot Localization and Mapping Using Scale-Invariant Features", "International Conference on Robotics & Automation", May 2001, pp. 2051-2058, Publisher: IEEE, Published in: CA.

Shah, "CAP 5415 Computer Vision", 2012, pp. 1-52, Published in: FL.

European Patent Office, "Office Action", "from Foreign Counterpart of U.S. Appl. No. 12/245,363", Feb. 12, 2013, pp. 1-6, Published in: EP.

European Patent Office, "European Search Report", "from Foreign Counterpart of U.S. Appl. No. 12/245,363", Jan. 30, 2013, pp. 1-4, Published in: EP.

Yokoya et al., "Range Image Segmentation Based on Differential Geometry: a Hybrid Approach", "8180 IEEE Transactions on Pattern Analysis and Machine Intelligence", Jun. 1989, pp. 643-649, No. 6.

Lukas et al., "Systems and Methods for Processing Extracted Plane Features", "U.S. Appl. No. 12/846,265, filed Jul. 29, 2010" pp. 1-30, Published in: US.

Dunik et al., "Systems and Methods for Evaluating Plane Similarity", "U.S. Appl. No. 13/242,701, filed Sep. 23, 2011", Sep. 23, 2011, pp. 1-43.

Ma et al., "Generic Surface Feature Extraction From a Set of Range Data", "U.S. Appl. No. 13/245,363, filed Sep. 26, 2011", , pp. 1-35, Published in: US.

Wu et al., "3D Model Matching With Viewpoint-Invariant Patches (VIP)", "2008 IEEE Conference on Computer Vision and Patten Recognition", Jun. 23-28, 2008, pp. 1-8.

European Patent Office, "Office Action", "from Foreign Counterpart of U.S. Appl. No. 12/846,265", Jan. 17, 2012, pp. 1-7, Published in: EP.

European Patent Office, "European Search Report", "from Foreign Counterpart of U.S. Appl. No. 12/846,265", Dec. 27, 2011, Published in: EP.

European Patent Office, "European Search Report", "from Foreign Counterpart of U.S. Appl. No. 12/234,331", Sep. 5, 2011, Published in: EP.

European Patent Office, "Office Action", "from Foreign Counterpart of U.S. Appl. No. 12/234,331", Oct. 6, 2011, pp. 1-5, Published in: EP.

U.S. Patent and Trademark Office, "Advisory Action", "U.S. Appl. No. 12/234,331", Jun. 25, 2012, pp. 1-3.

U.S. Patent and Trademark Office, "Final Office Action", "U.S. Appl. No. 12/234,331", Apr. 9, 2012, pp. 1-20.

U.S. Patent and Trademark Office, "Office Action", "U.S. Appl. No. 12/234/331", Nov. 21, 2011, pp. 1-23.

U.S. Patent and Trademark Office, "Office Action", "U.S. Appl. No. 12/234,331", Aug. 28, 2012, pp. 1-19.

Arras et al., "Feature Extraction and Scene Interpretation for Map-Based Navigation and Map Building", "Mobile Robotics XII", 1997, pp. 1-12, vol. 3210, Publisher: SPIE.

Barnat, J. et al., "Distributed LTL Model-Checking in SPIN", "International Workshop on SPIN Model Checking", Jan. 1, 2001, pp. 200-216, Publisher: Springer-Verlag New York, Inc.

Bosnacki, D. et al., "Symmetric Spin", "Lecture Notes in Computer Science", 2000, pp. 1-19, No. 1885, Publisher: Springer-Verlag.

Bay et al., "SURF: Speeded Up Robust Features", "Proceedings of 9th European Conference on Computer Vision", May 7-13, 2006, pp. 1-14, Published in: Graz, Austria.

Beucher, "The Watershed Transformation Applied to Image Segmentation", Sep. 1991, pp. 1-26, Published in: FR.

Bosnacki et al., "A Heuristic for Symmetry Reductions with Scalarsets", "Proc. Int. Symp. Formal Methods for Increasing Sofware Productivity", Mar. 12, 2001, pp. 518-533, Publisher: Lecture Notes in Computer Science.

Brim, L. et al., "Distributed LTL Model Checking Based on Negative Cycle Detection", "Lecture Notes in Computer Science", Sep. 1, 2001, pp. 96-107, vol. 2245, Publisher: Springer-Verlag.

Canny, "A Computational Approach to Edge Detection", "Transactions on Pattern Analysis and Machine Intelligence", Nov. 1986, pp. 679-698, vol. 8, No. 6, Publisher: IEEE.

"DARPA Grand Challenge '05", "available at http://www.darpa.mil/grandchallenge05/ accessed Jun. 9, 2010", Dec. 31, 2007, p. 1 Publisher: DARPA.

"Navigation—The Future—Galileo", "available at http://www.esa.int/esaNA/galileo.html accessed Jun. 9, 2010", 2000, pp. 1-2, Publisher: European Space Agency (ESA).

"GLONASS Status", "Information—Analytical Centre available at http://www.glonass-ianc.rsa.ru/pls/htmldb/f?p=202:20:2275518349255099::NO accessed Jun. 9, 2010", 2006, p. 1 Publisher: Russian Space Agency, Information-analytical centre.

"Global Navigation Satellite System", "available at http://www.spirent.com/Positioning-and-Navigation/GNSS.aspx", 2010, pp. 1-2, Publisher: Spirent Communications plc, accessed Jun. 9, 2010.

Gonzalez et al., "Segmentation by Morphological Watersheds", "Digital Image Processing (2nd Edition)", Jan. 15, 2002, pp. 617-626, No. 10.5, Publisher: Prentice-Hall.

Goshtasby et al., "Point Pattern Matching Using Convex Hull Edges", "IEEE Transtcions on Systems, Man, and Cybernetics ", Sep./Oct. 1985, pp. 631-637, vol. 15, No. 5.

"Global Positioning System: Serving the World", "http://www.gps.gov/ accessed Jun. 9, 2010", , pp. 1-2, Publisher: USA.gov.

Gu et al., "Vision-Aided UAV Navigation using GIS Data", Jul. 15, 2010, pp. 78-82.

Guo et al., "Vision-Based Drivable Surface Detection in Autonomous Ground Vehicles", "Proceedings of the 2006 IEEE/RSJ International Conference on Intelligent Robots and Systems", Oct. 9, 2006, pp. 3273-3278.

(56) References Cited

OTHER PUBLICATIONS

Haag, "Implementation of a Flash-LADAR Aided Inertial Navigator", May 5, 2008, pp. 560-567, Publisher: IEEE.
Haralick, "Propagating Covariance in Computer Vision", "Performance Characterization in Computer Vision", Aug. 31, 2000, pp. 1-15, vol. 17, Publisher: Springer Series on Computational Imaging and Vision.
Harris et al., "A Combined Corner and Edge Detector", Aug. 1988, pp. 147-151, Publisher: The Plessey Company, Published in: United Kingdom.
R. Hartley, "In Defense of the Eight-Point Algorithm", "IEEE Transactions on Pattern Analysis and Machine Intelligence", Jun. 1997, pp. 580-593, vol. 19, No. 6, Publisher: IEEE.
Hendriks, M. et al., "Adding Symmetry Reduction to UPPAAL", "Lecture Notes in Computer Science", May 13, 2004, pp. 46-59, vol. 2791, Publisher: Springer Berlin.
Hoppe et al., "Surface Reconstruction From Unorganized Points", 1992, pp. 71-78, Publisher: University of Washington.
Horn et al., "Closed-Form Solution of Absolute Orientation Using Unit Quaternions", "Journal of the Optical Society of America", Apr. 1987, pp. 629-642, vol. 4, Publisher: Optical Society of America.
Iosif, Radu, "Symmetry Reduction Criteria for Software Model Checking", "Lecture Notes in Computer Science", Jan. 1, 2002, p. 22-41, vol. 2318, Publisher: Springer-Verlag.
Irschara et al., "From Structure-From-Motion Point Clouds to Fast Location Recognition", "IEEE Computer Society Conference on Computer Vision and Pattern Recognition", Apr. 18, 2009, pp. 1-8.
"Indian Space Research Organisation", "available at http://www.isro.org/ accessed Jun. 9, 2010", 2008, p. 1 Publisher: ISRO.
Jean et al., "Trajectories Normalization for Viewpoint Invariant Gait Recognition", Dec. 8, 2008, pp. 1-4, Publisher: IEEE.
Krishnaswamy et al., "Sensor Fusion for GNSS Denied Navigation", "IEEE/ION Position, Location, and Navigation Symposium", May 5, 2008, pp. 1-11, Publisher: IEEE.
Lerda, Flavio and Riccardo Sisto, "Distributed-Memory Model Checking with SPIN", "Lecture Notes in Computer Science", Jan. 1, 1999, pp. 22-39, vol. 1680, Publisher: Springer-Verlag.
Lin, Chung-Chen and Rey-Jer You, "Planar Feature Extration from LIDAR Data Based on Tensot Analysis", "available at: htip://www.aars-acrs.org/acrs/proceeding/ACRS2006/Papers/M-1_M5.pdf", 2006, pp. 1-7, Publisher: Asian Association on Remote Sensing.
Lingemann et al., "High-Speed Laser Localization for Mobile Robots", "Robotics and Autonomous Systems", Jun. 2005, pp. 275-296, vol. 51, No. 4, Publisher: Elsevier B.V.
Lowe, D.G., "Distinctive Image Features from Scale-Invariant Keypoints", "International Journal of Computer Vision", Jan. 5, 2004, pp. 91-110, vol. 60, No. 2.
Manku, G. et al., "Structural Symmetry and Model Checking", "Lecture Notes in Computer Science", Jun. 28, 1998, p. 159-171, vol. 1427, Publisher: Springer-Verlag.
McKinnon, "Point, Line Segment, and Region-Based Stereo Matching for Mobile Robotics", Aug. 2009, pp. 1-126, Published in: CA.
Meier et al., "Object Detection and Tracking in Range Image Sequences by Separation of Image Features", "IEEE International Conference on Intelligent Vehicles", Oct. 1998, pp. 280-284.
Nister, "An Efficient Solution to the Five-Point Relative Pose Problem", "Pattern Analysis and Machine Intelligence", Jun. 2004, pp. 1-17, vol. 26, No. 6, Publisher: IEEE.
Norris IP, C. and David L. Dill, "Better Verification Through Symmetry", "IFIP Transactions", 1996, pp. 1-34, vol. 9, No. 1/2, Publisher: North-Holland Publishing Co.
U.S. Patent and Trademark Office, "Office Action", "from U.S. Appl. No. 13/745,892", Mar. 6, 2015, pp. 1-77, Published in: US.
U.S. Patent and Trademark Office, "Office Action", "from U.S. Appl. No. 13/242,701", Jun. 20, 2014, p. 1-52, Published in: US.
Park et al., "Multiscale Surface Representation Scheme for Point Clouds", "Intelligent Signal Processing and Communication Systems, 2004", Nov. 18, 2004, pp. 232-237, Publisher: IEEE.
Parra et al., "Robust Visual Odometry for Complex Urban Environments", "IEEE Intelligent Vehicles Symposium", Jun. 4-6, 2008, pp. 440-445, Publisher: IEEE, Published in: Eindhoven, The Netherlands.
Pauly et al., "Efficient Simplification of Point-Sampled Surfaces", "http://www.agg.ethz.ch/publications/journal_and_conference/#2002", Nov. 1, 2002, pp. 1-8, Publisher: IEEE Visualization 2002.
Pauly et al., "Point-Based Multi-Scale Surface Representation", "http://www.agg.ethz.ch/publications/journal_and_conference/#2006", Apr. 2, 2006, pp. 177-193, vol. 25, No. 2, Publisher: ACM Transactions on Graphics 2006.
Pfister, "Multi-scale Point and Line Range Data Algorithms for Mapping and Localization", "Proceedings of the 2006 IEEE International Conference on Robotics and Automation", May 15, 2006, pp. 1159-1166, Publisher: IEEE.
Pfister, "Algorithms for Mobile Robot Localization and Mapping, Incorporating Detailed Noise Modeling and Multi-Scale Feature", Apr. 14, 2006, pp. 1-200.
De La Puente et al., "3D Feature Based Mapping Towards Mobile Robots' Enhanced Performance in Rescue Mission", Oct. 10, 2009, pp. 1-6, Publisher: IEEE.
De La Puente, "Extraction of Geometrical Features in 3D Environments for Service Robotic Applications", Sep. 24, 2008, pp. 441-450, Publisher: Springer-Verlag Berlin.
Rangarajan, M. et al., "Analysis of Distributed Spin Applied to Industrial-Scale Models", "Lecture Notes in Computer Science", Apr. 2004, pp. 1-19, vol. 2989, Publisher: Springer Verlag.
Roncella, "Extraction of Planar Patches From Point Clouds to Retrieve Dip and Dip Direction of Rock Discontinuities", Sep. 12, 2005, pp. 162-167, vol. 3.
Sagues et al, "Robust line matching in image pairs of scenes with dominant planes", "Optical Engineering", 2006, pp. 1-12, vol. 45, No. 6.
Schnabel, "Efficient RANSAC for Point-Cloud Shape Detection", "Computer Graphics Forum", Jun. 2007, pp. 214-226, vol. 26, No. 2, Publisher: Blackwell Publishing.
Semwal et al., "Geometric-Imprints: A Significant Points Extraction Method for the Scan&Track Virtual Environment", Apr. 14, 1998, pp. 1-6, Publisher: IEEE.
Shapiro, Linda and Robert Haralick, "Relational Matching", "Applied Optics", May 15, 1987, pp. 1845-1851, vol. 26, No. 10, Publisher: Optical Society of America, Published in: Seattle, WA.
Soehren, Wayne and Wes Hawkinson, "Prototype Personal Navigation System", "IEEE A&E Systems Magazine; Based on Presentation at PLANS 2006", Apr. 2008, pp. 10-18, Publisher: IEEE.
Soloviev, Andrey, "Tight Coupling of GPS, Laser Scanner, and Inertial Measurements for Navigation in Urban Environments", "Proceedings of IEEE/ION Position, Location, and Navigation Symposium (PLANS v2008)", May 6-8, 2008, pp. 511-525, Publisher: IEEE.
Spero, D.J. and R. A. Jarvis, "Simultaneous Localisation and Map Building: the Kidnapped Way", "Intelligent Robotics Research Center MECSE-3-2007", 2005, pp. 1-12, Publisher: Monash University.
Stamos et al., "Integration of Range and Image Sensing for Photorealistic 3d Modeling", Apr. 24, 2000, pp. 1-8, Publisher: IEEE.
Stern, Urlich and David L. Dill, "Parallelizing the Mur Verifier", "Formal Methods in System Design ", Jun. 22, 2001, pp. 117-129, vol. 18, No. 2, Publisher: Kluwer Academic Publishers.
Sara Susca, "GNSS—Independent Navigation Solution Using Integrated LiDAR Data", "Proceedings of the 2010 International Technical Meeting of the Institute of Navigation", Jan. 25-27, 2010, pp. 205-213, Publisher: ION.
"Tactical Advanced Land Inertial Navigator (TALIN)", Feb. 2007, pp. 1-2, Publisher: Honeywell International Inc.
Tseng et al., "Automatic Plane Extraction from LIDAR Data Based on Octree Splitting and Merging Segmentation", "Geoscience and remote Sensing Symposium 2005", Jul. 2005, pp. 3281-3284, vol. 5, Publisher: IEEE.
Ujit De Haag et al., "Implementation of a Flash-LADAR Aided Inertial Navigator", "Position, Location and Navigation Symposium", May 5-8, 2008, pp. 560-567, Publisher: 2008 IEEE/ION.
Vedaldi et al., "On Viewpoint Invariance for Non-Planar Scenes", "UCLA CSD Technical Report #TR050012", Mar. 3, 2006, pp. 1-22.

(56) References Cited

OTHER PUBLICATIONS

"High Definition Lidar", "available at http://www.velodyne.com/lidar accessed Jun. 9, 2010", 2008, p. 1 Publisher: Velodyne Acoustics, Inc.

Venable, Donald T., "Implementation of a 3D Imaging Sensor Aided Inertial Measurement Unit Navigation System", "Thesis", Aug. 2008, pp. 1-111, Publisher: Ohio University.

Veth et al., "Tightly-Coupled INS, GPS, and Imaging Sensors for Precision Geolocation", "Wright Patterson AFB, OH, http://www.docstoc.com/docs/1032359/Tightly-Coupled-INS-GPS-and-Imaging-Sensors-for-Precision-Geolocation", Jan. 2008, pp. 1-12, Publisher: Air Force Institute of Technology, Department of Electrical and Computer Engineering.

Von Hansen et al., "Cluster Analysis and Priority Sorting in Huge Point Clouds for Building Reconstruction", "Proceedings of the 18th International Conference on Pattern Recognition", Sep. 18, 2006, pp. 23-26, Publisher: IEEE.

Yang, "Plane Detection in Point Cloud Data", "Technical Report Nr. 1, 2010", Jan. 25, 2010, pp. 1-16, Publisher: Institute of Geodesy and Geoinformation, University of Bonn.

Zavodny et al., "Region Extraction in Large-Scale Urban LIDAR data", "2009 IEEE 12th International Conference on Computer Vision Workshops", Sep. 2009, pp. 1801-1808, Publisher: IEEE.

Lin et al., "Robust Invariant Features for Object Recognition and Mobile Robot Navigation", "IAPR Conference on Machine Vision Applications", May 2005, pp. 1-4.

U.S. Patent and Trademark Office, "Office Action", "U.S. Appl. No. 13/242,701", Jan. 29, 2015, pp. 1-6.

U.S. Patent and Trademark Office, "Restriction Requirement", "from U.S. Appl. No. 13/242,701", Jan. 31, 2014, pp. 1-6, Published in: US.

European Patent Office, "European Office Action from Application No. 14150387.0 mailed May 9, 2014", "from Foreign Counterpart of U.S. Appl. No. 13/745,893", filed May 9, 2014, pp. 1-8, Published in: EP.

U.S. Patent and Trademark Office, "Notice of Allowance", "U.S. Appl. No. 13/245,363", Jul. 2, 2013, pp. 1-28.

European Patent Office, "European Search Report from EP Application No. 14150388.8 mailed Apr. 23, 2014", "from Foreign Counterpart of U.S. Appl. No. 13/745,892", filed Apr. 23, 2014, pp. 1-3, Published in: EP.

Cha, "Comprehensive Survey on Distance/Similarity Measures between Probability Density Functions", "International Journal of Mathematical Models and Methods in Applied Sciences", Jan. 1, 2007, pp. 300-307, vol. 1, No. 4.

Gonzalez-Jimenez et al., "Distance Measures for Gabor Jets-Based Face Authentication: A Comparative Evaluation", "Field Programmable Logic and Application", Jan. 1, 2007, pp. 474-483, vol. 4642.

Lo et al., "Local feature extraction and matching on range images: 2.5D SIFT", "Computer Vision and Image Understanding", Dec. 1, 2009, pp. 1235-1250, vol. 113, No. 12.

European Patent Office, "Office Action from EP Application No. 14150388.8 mailed May 9, 2014", "from Foreign Counterpart of U.S. Appl. No. 13/745,892", filed May 9, 2014, pp. 1-5, Published in: EP.

European Patent Office, "European Search Report from EP Application No. 14150387.0 mailed Apr. 23, 2014", "from Foreign Counterpart of U.S. Appl. No. 13/745,893", filed Apr. 23, 2014, pp. 1-3, Published in: EP.

Baccar et al., "Segmentation of Range Images Via Data Fusion and Morphological Watersheds", "Pattern Recognition", Oct. 1, 1996, pp. 1673-1687, vol. 29, No. 10, Publisher: Elsevier Science Ltd., Published in: GB.

Chen et al., "Residual Analysis for Feature Detection", "IEEE Transations on Pattern Analysis and Machine Intelligence", Jan. 1, 1991, pp. 3040, vol. 13, No. 1, Publisher: IEEE.

Reitberger et al., "3D segmentation of single trees exploiting full waveform LIDAR data", "ISPRS Journal of Photogrammettry and Remote Sensing", Nov. 1, 2009, pp. 561-574, vol. 64, No. 6.

U.S. Patent and Trademark Office, "Advisory Action", "U.S. Appl. No. 13/242,701", Dec. 29, 2014, pp. 1-3.

U.S Patent and Trademark Office, "Notice of Allowance", "U.S. Appl. No. 13/745,892", Jul. 13, 2015, Published in: US.

* cited by examiner

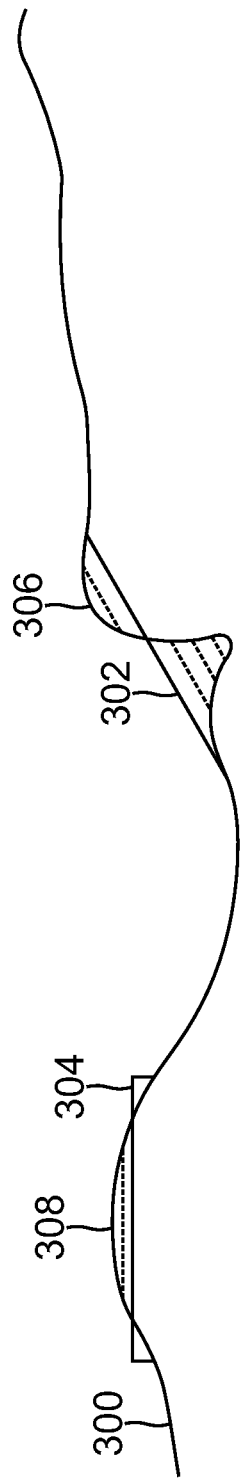
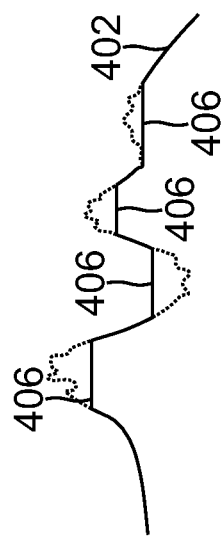
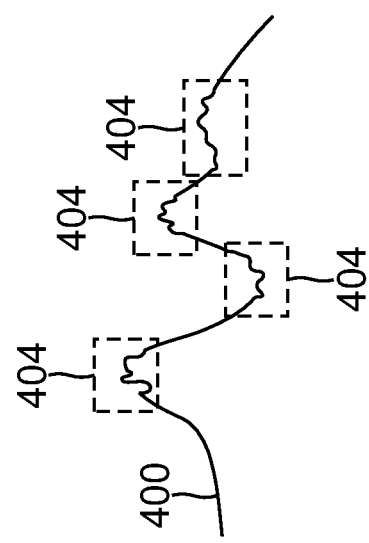
FIG. 3
FIG. 4

SYSTEMS AND METHODS FOR 3D DATA BASED NAVIGATION USING A WATERSHED METHOD

BACKGROUND

Vision based navigation systems use data captured through sensors that scan the environment through which the navigation system travels. In certain embodiments, the sensors provide a three-dimensional description of the environment containing the navigation system. To determine the movement and position of the navigation system based on the three-dimensional data, the navigation system compares three-dimensional data gathered at different times to detect changes in movement and position of the navigation system in relation to the environment. However, a three-dimensional scan of an environment provides large amounts of data and calculating the amount of data provided by a three-dimensional scan of the environment is difficult to perform within a reasonable amount of time.

SUMMARY

Systems and methods for 3D data based navigation using a watershed method are provided. In at least one embodiment, a method for segmenting three-dimensional frames of data comprises acquiring at least one frame from at least one sensor, wherein the at least one frame provides a three-dimensional description of an environment containing the at least one sensor; and identifying a surface in the at least one frame. The method further comprises computing at least one residual map for the at least one frame based on the orthogonal distance from data points on the surface to at least one polynomial surface fitted to the surface; and segmenting the at least one residual map by performing a watershed algorithm on the residual map.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 3 is a surface profile illustrating the calculation of a residual in one embodiment described in the present disclosure;

FIG. 4 is a surface profile of a residual map illustrating the smoothing of extrema in one embodiment described in the present disclosure;

Figure 1:
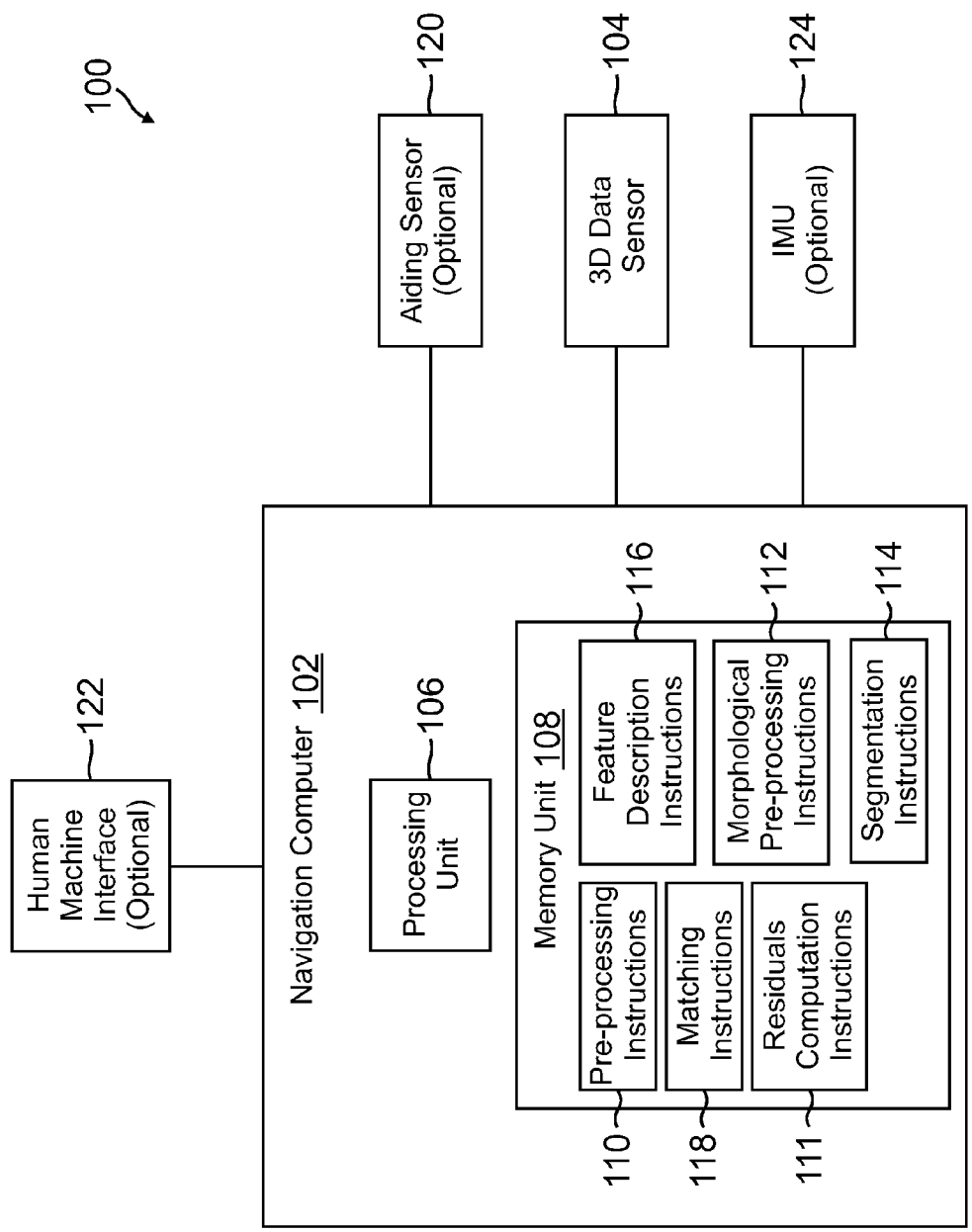
FIG. 1 is a block diagram of a system for performing three-dimensional data based navigation in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present disclosure address systems and methods for three-dimensional data based navigation. In particular, embodiments of the present disclosure describe a navigation system that quickly and accurately processes three-dimensional data from a sensor to provide a navigation solution for a mobile vehicle or person. To process the three-dimensional data, the navigation system segments the data and uses the identified segments when calculating or updating the navigation solution. For example, the navigation system acquires frames at different time instances, segments the different frames, and then identifies corresponding segments in the different frames. The navigation system uses the differences in the position and orientation of corresponding segments to calculate or update the navigation solution. In a further embodiment, the navigation system morphologically processes the frames of data before segmenting the frames. Subsequently, a watershed method is able to generically and accurately generate stable features of the environment containing the navigation system. Further, in certain embodiments, when the data is segmented, the navigation system determines descriptor vectors for the identified segments, where a descriptor vector is an indexed vector of multiple characteristics of the segment. The navigation system then compares the descriptor vectors associated with segments from different frames to identify the corresponding segments. As stated above, the differences in position and orientation of corresponding segments are used to update and calculate the navigation solution.

FIG. 1 is a block diagram illustrating a navigation system 100. The navigation system 100 exists on a vehicle or an individual that is traveling through an environment and functions to provide a navigation solution describing the motion of the vehicle or individual. In certain embodiments, the navigation solution describes at least one of the position, heading, velocity, and attitude of the vehicle or individual. To determine the navigation solution, the navigation system 100 includes sensors that acquire information at particular moments in time, where the acquired information describes the environment through which the navigation system 100 is travelling or the information describes the motion of the navigation system 100. The navigation system 100 uses changes in the information between different measurements to determine the navigation solution of the vehicle.

In at least one embodiment, the navigation system 100 uses at least one three-dimensional data sensor 104 to acquire information about the environment containing the navigation system 100. For example, the 3D data sensor 104 can include a LiDAR sensor or radar that acquires range and azimuthal information describing the environment. Alternatively, the 3D data sensor 104 can include multiple cameras that are offset from one another in such a way that data from the multiple cameras can be processed to provide stereoscopic images from which range and azimuthal information can be derived. In some embodiments, fusion of multiple sensors, for example but not limited to, radar and electro-optical (EO) camera, can be used in place of the 3D data sensor 104. Within the navigation system 100, the 3D data sensor 104 provides three-dimensional data describing the environment containing the 3D data sensor 104 to a navigation computer 102.

The navigation computer 102 is a computer that calculates the navigation solution for the navigation system 100 based on measurements received from sensors and previously acquired data describing the environment. Navigation computer 102 includes a processing unit 106 and a memory unit 108. In at least one implementation, the processing unit 106 is a programmable device that processes data received from the image sensor as instructed by instructions stored on the memory unit 108.

In certain embodiments, the memory unit 108 is an electronic hardware device for storing processor readable data and instructions. In one embodiment, the memory unit 108 includes any appropriate processor readable medium used for storage of processor readable instructions or data structures. The processor readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In certain embodiments, to use data from the 3D data sensor 104 to calculate a navigation solution, the memory unit 108 stores multiple sets of executable instructions thereon. For example, memory unit 108 stores pre-processing instructions 110, residuals computation instructions 111, morphological pre-processing instructions 112, segmentation instructions 114, feature description instructions 116, and matching instructions 118.

In some embodiments, data from the 3D data sensor 104 come in a form suitable for fast and efficient processing—in a regular grid 3D image. In other embodiments, data may be pre-processed to the shape of dense 3D image to allow fast and efficient further processing. In such case, raw data from the sensor can be arranged into a grid (or more grids) suitable for further processing. In some embodiments, data may be interpolated and/or extrapolated in order to treat missing or incorrect data.

As described herein, the pre-processing instructions 110 direct processing unit 106 to prepare acquired data for subsequent processing. In certain embodiments, processing unit 106 receives raw measurements from the 3D data sensor 104. The processing unit 106 executes the pre-processing instructions 110 to preprocess the raw measurements by sorting the raw measurements into a standard grid size. A Standard grid size may be application and/or 3D data sensor 104 dependent. In at least one exemplary implementation, a grid may have a size of 64×4096. In other embodiments, other grid sizes may be used. In some embodiments, 3D data arranged into the standard grid size may have no data in certain grid cells. In such case, data can be added to the grid cells that lack data through interpolation of missing data, filtering, and extrapolation. Also, in some embodiments, the raw measurements provided by the 3D data sensor 104 may have dimensions that differ from the dimensions of other previously acquired processed measurements. To facilitate the comparison of the raw measurements to the previously acquired processed measurements, the raw measurements are filtered to remove a portion of the noise, and then the raw measurements are interpolated or extrapolated to adjust the size of the raw measurements to a standard size for comparison to the previously acquired processed measurements. The interpolation part of the pre-processing instructions 110 generally functions according to methods that are generally known to one having skill in the art. When the raw measurements are processed by processing unit 106 as directed by the pre-processing instructions 110, the measurements are available for subsequent processing as pre-processed measurements.

When the data has been pre-processed, the processing unit 106 executes the residuals computation instructions 111 to aid in the detection of depth and orientation discontinuities. The residuals computation instructions 111 instruct the processing unit 106 to create a residual map of the pre-processed measurements. Pre-processed measurements that are associated with flat or nearly flat surfaces will have low residual values and areas with larger changes in depth and orientation, such as discontinuities, will have higher residual values. In one embodiment, the processing unit 106 calculates the residual map as a sum of distances of data points from a hypothetically fitted plane within a specified local neighborhood. In other embodiments, a residual map can be computed as a sum of distances not from a plane but a general polynomial surface. In other embodiments, other techniques can be used as long as the property that residual map amplifies areas of discontinuity or changes in surface orientation are preserved. For example, but not limited to, mean value may be taken instead of sum, etc. The residuals computation instructions 111 direct the processing unit 106 to create a map of the residual values for the different points in the pre-processed measurements.

In at least one embodiment, when the residual map is created, the morphological pre-processing instructions 112 direct the processing unit 106 to perform a smoothing operation on the residual map. In one embodiment, this is done by morphological reconstruction methods, e.g. opening or closing by reconstruction. Morphological reconstruction methods aid in smoothing the minimum and/or maximum surfaces to prevent over-segmentation of the residual map during subsequent processing. The over-segmentation of the residual map can lead to unsuitable or useless segmentation results and/or an increased computation load on the processing unit 106, by performing the smoothing operation or other similar morphological method, the processing unit 106 can prevent over-segmentation by smoothing the extrema of the residual map.

When the residual map has been smoothed, the processing unit 106 executes the segmentation instructions 114. Segmentation instructions 114 direct the processing unit 106 to segment the residual map into different segments. For example, the processing unit 106 segments the residual map into different segments using a watershed method. When the processing unit 106 segments the residual map using the watershed method, the processing unit 106 considers the residual map to be a topographic surface. The processing unit 106 then identifies the minima in the residual map and pretends that the minima represent the bottom of catchment basins within the topographic surface of the residual map, where the catchment basins collect water from a hypothetical particular watershed. When the minima are identified, the processing unit 106 virtually fills each catchment basins and their accompanying watershed from the bottom. As the watersheds are filled, the different watersheds will come into contact with one another. The processing unit 106 demarcates the locations where different watersheds contact one another as boundaries between the segments.

In certain implementations, the watershed segmentation can result in many different segments. When there are more segments than can be feasibly processed by processing unit 106, the segmentation instructions 114 direct the processing unit 106 to merge segments together. To determine which segments to merge together, the processing computer identifies multiple different characteristics describing bordering segments. If the segments have substantially similar characteristics, the segments are merged together. For example, the processing unit 106 identifies characteristics such as normal vectors to the surface of the segments, distance of the segment surfaces from a common point, and the like.

In alternative embodiments, segmentation instructions 114 instruct processing unit 106 to identify features or segments using a method other than the watershed method. For example, segments and features can be extracted using a scale-invariant feature transform (SIFT) method, a speed-up robust feature (SURF) extraction method, a Kanade Lucas Tomasi (KLT) feature extraction method, a differential geometry-based segmentation, and the like.

When frames acquired by the 3D data sensor 104 are segmented or features are identified in the frames, the processing unit 106 executes feature description instructions 116. The feature description instructions 116 instruct the processing unit 106 to create a feature descriptor for each feature or segment identified in the 3D data. For example, in certain embodiments, when features are identified using a SIFT, SURF, KLT, or other feature extraction algorithm, the feature extraction algorithm provides a unique feature descriptor. Alternatively, the feature description instructions 116 can direct the processing unit 106 to create a descriptor vector to describe the feature or segment. The descriptor vector is a multi-dimensional vector that describes characteristics of a segment. The descriptor vector and/or unique feature descriptor enables the quantifiable determination by a processing unit 106 as to whether segments from different frames are similar. As used herein below, the unmodified term "descriptor" refers to both a descriptor vector and a unique feature descriptor. Further, the term "segment," as used below, refers to both a feature extracted from image data or a segment identified by the segmentation of data from the 3D data sensor 104.

When the processing unit 106 has created a descriptor vector or calculated a unique feature descriptor for the identified segments, the processing unit 106 executes the matching instructions 118 to determine whether segments from images acquired at different instances in time by the 3D data sensor 104 correspond to one another. To determine if a segment in a first frame corresponds to a segment in a second frame, the processing unit 106 compares the descriptors for the first segment and the second segment and determines a similarity of the different descriptors based on a given similarity measure. In certain embodiments, if the similarity measure indicates that the different segments correspond to one another, the processing unit 106 determines the differences between positions of the two different segments in relation to the navigation system 100 to calculate a navigation solution for the navigation system 100.

In certain alternative implementations, the navigation system 100 includes aiding sensors 120 other than the 3D data sensor 104. For example, the aiding sensor 120 may detect range, provide GPS data, acquire visual imagery, and the like. In a further alternative implementation, the navigation system 100 may include other sensors that provide navigational data to the navigation computer 102. For example, the navigation computer 102 may receive inertial measurement data from an inertial measurement unit (IMU) 124. As one having skill in the art would recognize, the inertial measurement unit 124 provides inertial measurements associated with acceleration and/or rotation as measured by multiple accelerometers and gyroscopes. The processing unit 106 may use the additional navigation information from the aiding sensors 120 and the IMU 124 to calculate a navigation solution for the navigation system 100. In certain implementations, when the navigation solution is calculated, the navigation computer provides the navigation solution to a human machine interface 122, where the human machine interface 122 can provide information derived from the calculated navigation solution to a user. In at least one implementation, the human machine interface 122 includes a display for displaying the information, a speaker for providing audio information, and/or an input device such as a keyboard, pointer, touch screen, etc. that allow the user to input information.

Figure 2:
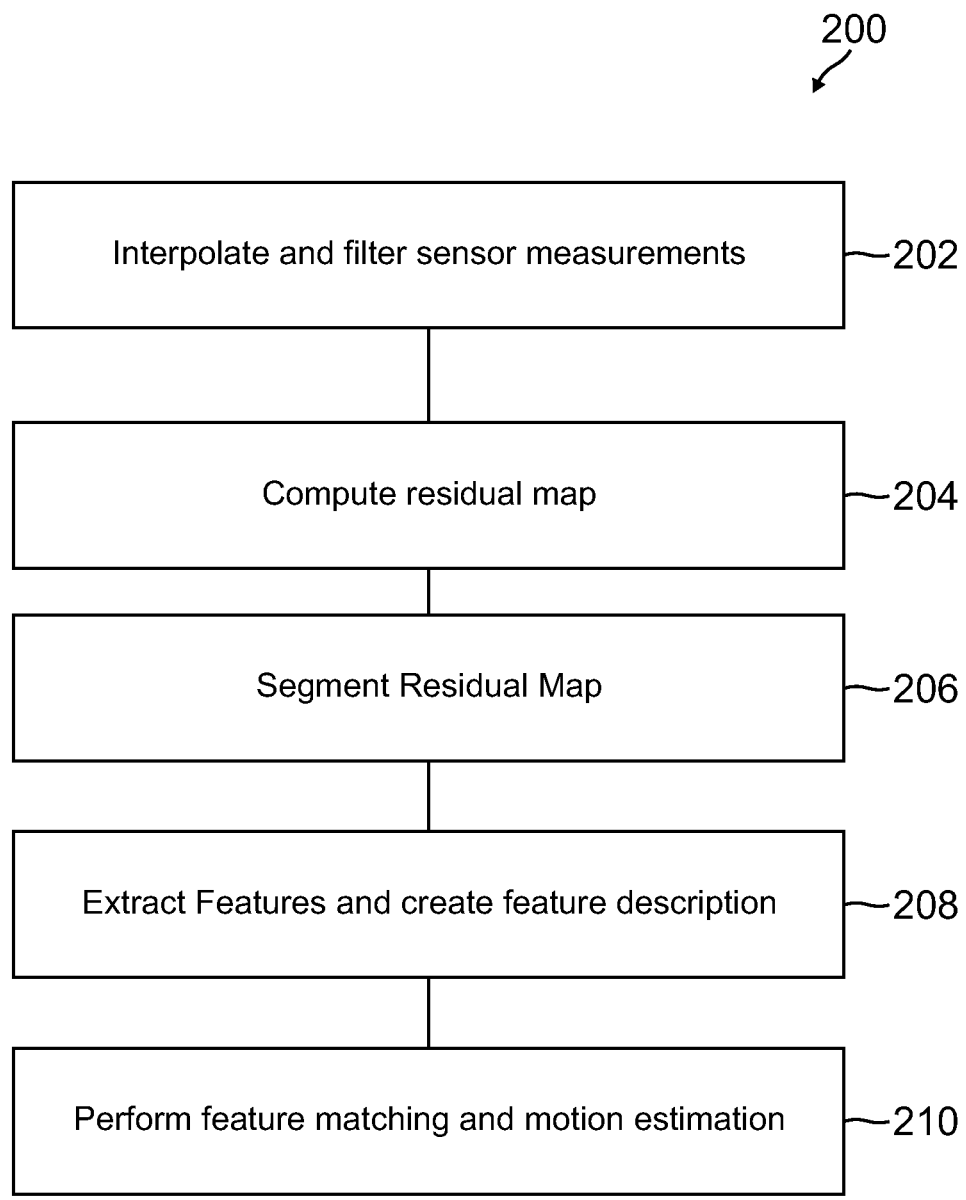
FIG. 2 is a flow diagram for performing three-dimensional data based navigation in one embodiment described in the present disclosure.

FIG. 2 is a flow diagram illustrating one embodiment of a possible feature extraction and matching method 200 where 3D data acquired by a 3D data sensor are segmented by a watershed method. Further, in method 200, the segments are described through the use of descriptor vectors. As discussed above, the use of descriptor vectors to describe a segment can be used in conjunction with multiple algorithms that are able to extract features or segments from two-dimensional or three-dimensional image data. Likewise, the segments acquired through the watershed method disclosed herein can also be described through multiple different descriptors as described above. Further, FIGS. 3-10 are intended to provide explanatory examples for the different steps in method 200.

Feature extraction and matching method 200 proceeds at 202, where, in some embodiments, raw sensor measurements are arranged into a regular grid, interpolated, and/or extrapolated and filtered by methods that are generally known to one having skill in the art. In other embodiments, 3D data sensor 104 may provide data in such a form that some or even all operations mentioned in this paragraph may be omitted. For example, if the 3D data sensor 104 is a flash LiDAR, then the data from the sensor are already arranged into a regular grid with no missing data. Therefore, in such a case, no grid arranging, interpolation, or extrapolation are necessary. Further, sensor measurements that are received from a sensor, such as a LiDAR, can be noisy. Also, sensor measurements acquired during a first time period and a second time period may acquire data representations that offer different views of an environment, which different views can be scaled differently. For example, different measurements may acquire different views of the same environment, wherein the different views represent features within the environment from different angles and from different distances.

As described above, the arrangement into a regular grid, interpolation and filtering of the sensor measurements is performed by the processing unit 106 executing pre-processing instructions 110. In certain embodiments, the processing unit 106 receives raw measurements from a 3D data sensor 104. The processing unit 106 may sort the raw measurements into a standard grid size and interpolate missing data, filter noise, and extrapolate of the raw measurements, when needed. For example, the raw measurements are filtered to remove a portion of the noise, and then the raw measurements are interpolated or extrapolated to adjust the size of the raw measurements to a size suitable for subsequent processing. The pre-processing instructions 110 generally function according to methods that are generally known to one having skill in the art. When the raw measurements are processed by processing unit 106 as directed by the pre-processing instructions 110, the measurements are available for subsequent processing as pre-processed measurements.

When the measurements are arranged into a regular grid, interpolated, and filtered, the method 200 proceeds to 204, where a residual map is computed. The calculation of a residual map is performed by processing unit 106 upon the execution of residuals computation instructions 111. FIG. 3 is a diagram illustrating the calculation of residuals for surface data 300. When the processing unit 106 calculates the residuals for the surface 300, the processing unit 106 fits a hypothetical plane or series of planes to the surface 300. In other embodiments, 2D polynomial surfaces can be used instead of planes. For example, as illustrated in FIG. 3, a first plane 302 and a second plane 304 are fitted to the surface 300. When the plane or planes are fitted to the surface 300, the processing unit 106 calculates the orthogonal distances from points along surface 300 and the fitted plane, where the sum of orthogonal distances of all surface 300 points within certain neighborhood is the residual between the surface 300 and the nearest plane. In one embodiment, the local neighborhood of size 3×15 is used. The residual is directly proportional with the amount of discontinuity present at the location of a hypothetically fitted plane. For example, as shown in FIG. 3, the first plane 302 is fitted in a region containing a discontinuity 306. Due to the discontinuity 306, the distances between points on the surface 300 and the first plane 302 are large (and also the residuum is large) in the region of the discontinuity 306. In contrast, the second plane 304 is fitted in a region containing a relatively flat surface 308. Due to the flat surface 308, the orthogonal distances between points on the surface 300 and the second plane 304 are relatively small (and the residuum is also small) in the region of the flat surface 308. The magnitude of the shortest distance is proportional with the amount of discontinuity because the flat surface 308, having no discontinuity, is more closely approximated by the second plane 304, where the discontinuity 306 is not easily approximated by a first plane 302. When a plane closely approximates a surface 300, the distance between the surface 300 and the plane is small. In contrast, when a plane attempts to approximate a surface 300 through a discontinuity, the distance between the surface 300 and the plane is typically larger than the distance between the surface 300 and the plane when there is no discontinuity. Frequently, discontinuities in images are associated with edges of features. Thus, as the larger residual values are associated with discontinuities and discontinuities frequently occur at the edge of features, a large residual value is frequently associated with the edge of a feature.

When the residuals are calculated for the surface 300, the different residual calculations at the points along the surface 300 are compiled into a residual map. In a residual map, the maxima are generally associated with the edges of features. However, after the calculation of the residuals, noise that is present in the measurement and variations that are present on the surface of the environment can lead to either many local maxima or minima near the extrema of the residual map. Too many local maxima or minima at the regions of extrema of the residual map and other regions of the residual map can lead to an over segmentation of the residual map during subsequent process when watershed segmentation is applied. Many local minima created by noise create false tiny watersheds, thus causing over-segmentation of the surface. On the other hand, many local maxima created by noise can corrupt edges of extracted segments. To prevent the over segmentation of the residual map, the morphological pre-processing instructions 112 instruct the processing unit 106 to smooth minor variations in the residual map.

FIG. 4 illustrates a pre-smoothed cross sectional slice 400 and a post-smoothed cross sectional slice 402. As shown the pre-smoothed cross sectional slice 400 includes major extrema regions 404 having multiple minor extrema located within the major extrema regions 404. The major extrema regions consist of major maxima or major minima. Major maxima are generally associated with positional discontinuities and orientation changes in the data surface, while the minor extrema associated to major maximas are indicative of noise and surface variation at the discontinuity or orientation change regions. Major minimas are generally associated with relatively flat regions and minor extrema associated with these regions are indicative of region split to multiple smaller surfaces. When there are minor extrema located within the major extrema regions, the minor extrema can cause the image data to be over-segmented when segments are identified between points associated with the extrema. For example, within the major extrema region 404, there are multiple minor maximas, the space between these minor maximas can be identified as a segment when different algorithms are performed. In certain embodiments, when segments are found between all the minor maximas present in initially calculated residual map, the segmentation can lead to an overabundance of segments. The overabundance of segments can increase the computational load on processing unit 106 when determining motion information from the multiple segments. Further, as some of the minor extrema can be caused by random noise, segments based on the minor extrema typically lack robustness and can negatively affect the accuracy of subsequent feature matching.

In at least one implementation, the processing unit 106, upon executing the morphological pre-processing instructions 112, smoothes the surface of the residual map to remove the minor extrema so that subsequent segmentation is based only on the major extrema. In one embodiment, only major minima are smoothed. For example, as illustrated by the post-smoothed cross section slice 402, the minor extrema are removed from the pre-smoothed cross sectional slice 400. As illustrated in FIG. 4, the major extrema regions 404 can be flattened to remove minor extrema and form truncated extrema 406. In at least one implementation, the smoothing of the surface of the residual map is performed through an opening by reconstruction morphological method, closing by reconstruction morphological method, or the like.

Figure 5:
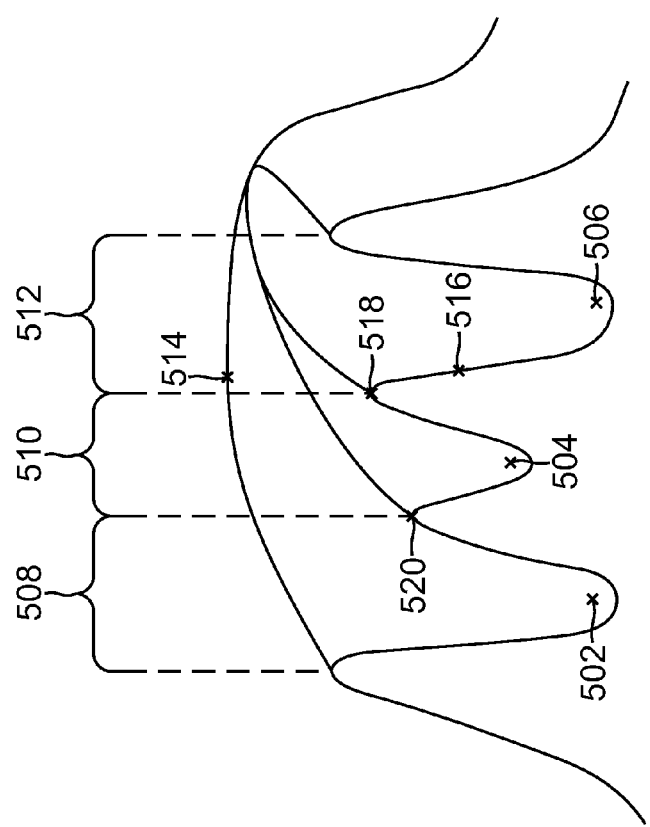
FIG. 5 is a perspective view of a portion of a residual map illustrating the watershed principle and catchment basins in one embodiment described in the present disclosure.

In at least one implementation, when a residual map has been smoothed, the method 200 proceeds to 206, where a residual map is segmented. For example, the processing unit 106 executes segmentation instructions 114 to identify the different segments in the residual map. In at least one implementation, the segmentation instructions 114 implement a watershed algorithm to segment the residual map. FIG. 5 illustrates a perspective view of a residual map that is segmented using the watershed method. For example, FIG. 5 includes a first minima 502, a second minima 504, and a third minima 506. Upon execution of the segmentation instructions 114, the processing unit 106 performs a watershed method. According to the watershed method, the processing unit 106 treats the different minima in the residual map as the bottom of hypothetical catchment basins 508, 510, and 512. The processing unit 106 then proceeds to fill the different catchment basins as if the residual map is gradually being submerged in a liquid and there are holes located at the different minima 502, 504, and 506. As the residual map is gradually submerged, the different catchment basins 508, 510, and 512 gradually fill, starting at their respective minima. The boundaries (514, 518, 520) of the catchment basins 508, 510, and 512 are defined at the locations where the liquid filling two adjacent catchment basins come into contact with one another. The segmentation of the residual map is completed when all catchment basins are flooded and therefore all boundaries of segments are defined. A watershed algorithm is generally known to one having skill in the art.

In at least one implementation of a watershed method, a processing unit 106 identifies the minimum residual value (denoted in FIG. 5 as minimum 502) and the maximum residual value (denoted as maximum 514). The processing unit 106 then sets a residual plane value to a value that is less than the minimum residual value 502. To flood the residual map, the processing unit 106 incrementally increases the residual plane value according to the resolution of the residual map until the residual plane value is greater than the maximum residual value 514. After every increment, the processing unit 106 identifies the points that have residual values that are less than the residual plane value. Further, the processing unit 106 associates each point having a residual value less than the residual plane value with a minimum, where the point has not been previously associated with a minimum. To associate a point with a minimum, the processing unit 106 identifies connected neighboring points that have a residual value less than the residual value of the point. The processing unit 106 then associates the point with the minimum that is associated with the connected neighboring points. For example, point 516 is associated with minimum 506. When the connected neighboring points are associated with two different minima, the processing unit 106 associates the point with both minima. For example, point 520 is associated with minimum 502 and minimum 504. By associating points with minima as the residual plane value is increased, the processing unit 106 is able to associate each point in the residual map with a minimum.

When each point is associated with a minimum, the processing unit 106 identifies segment boundaries by identifying the points in the residual map that are associated with more than one minima. For example, both points 520 and 518 are associated with more than one minima and are identified as segment boundaries between catchment basins 508 and 510 and catchment basins 510 and 512. By identifying the points associated with more than one minima, the processing unit is able to identify segment boundaries for the entire residual map. Further, in certain implementations, the processing unit 106 identifies the edges of the residual map as segment boundaries.

Figure 6:
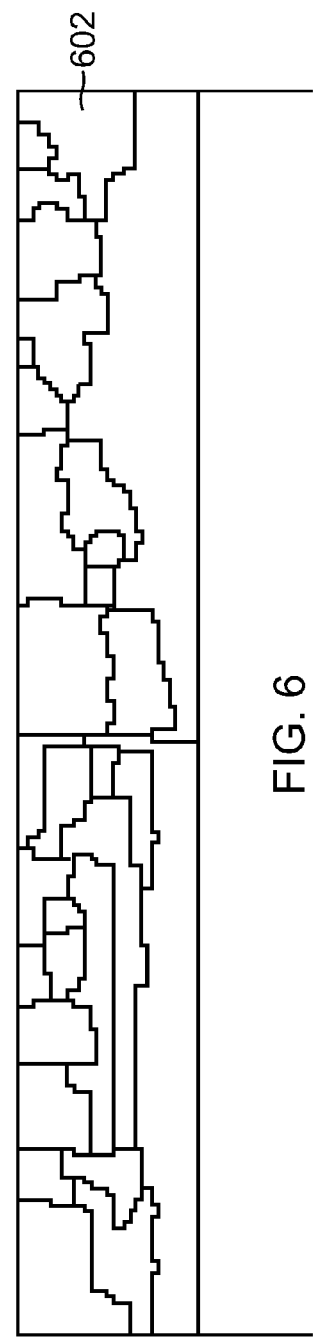
FIG. 6 is a diagram of a segmented residual map in one embodiment described in the present disclosure.

FIG. 6 is a diagram illustrating a segment map 600. In at least one embodiment, the segment map 600 is produced through the segmentation of a residual map as described above. In at least one implementation, when the residual map is segmented, the residual map is segmented using the watershed method. Alternatively, the segment map 600 can be acquired directly from an image using other methods. of feature extraction. For example, segments 602 in the segment map 600 are identified using the SIFT, SURF, or KLT feature extraction method. Also, the segments can be identified using differential geometry-based segmentation, edge detection algorithms, or other algorithms that can identify features or segments in the image. In at least one implementation, segments that are substantially similar to one another are merged with each other before they are further processed.

Figure 7:
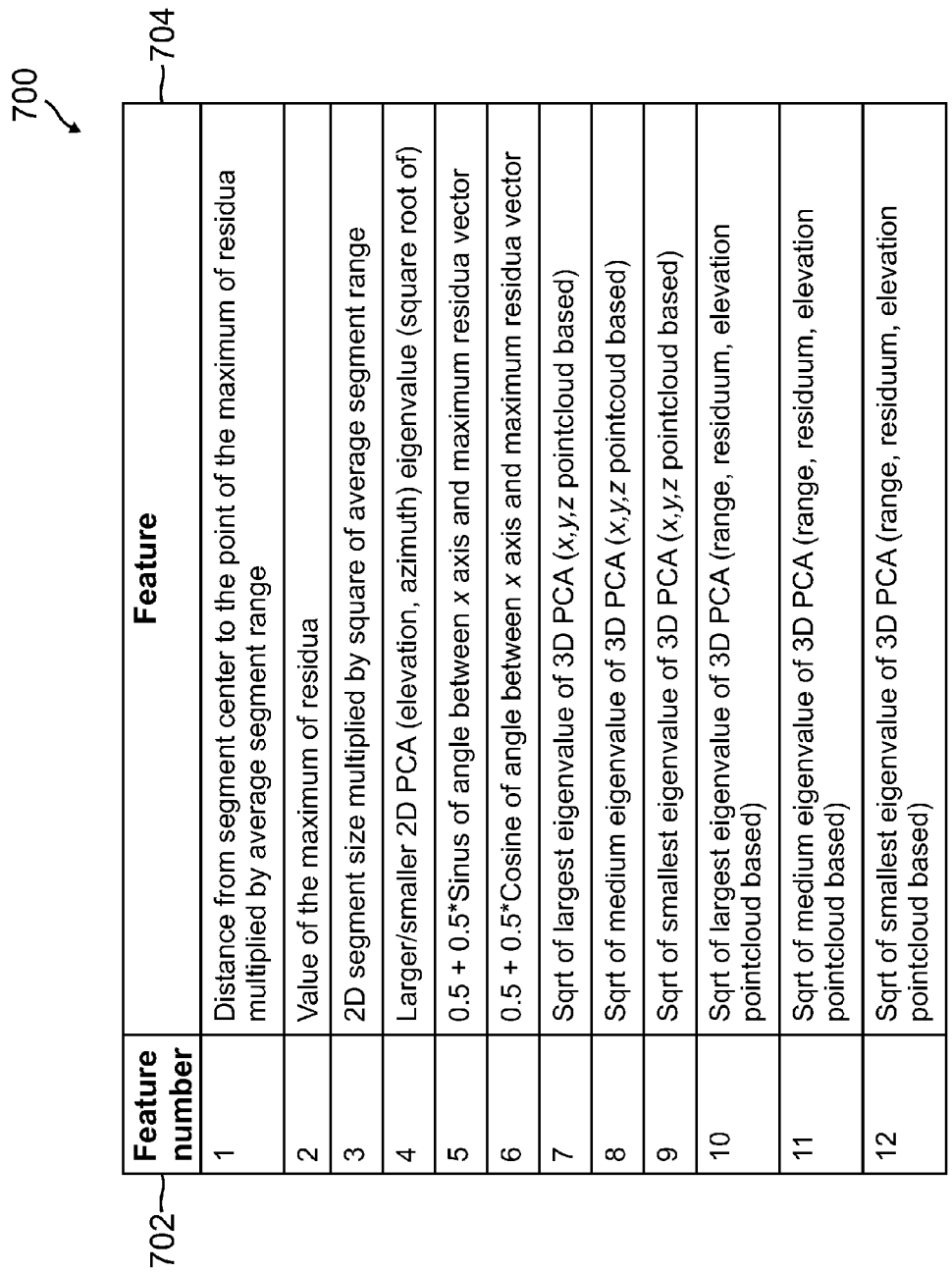
FIG. 7 is a table illustrating an example of a feature descriptor in one embodiment described in the present disclosure.

When the residual map is segmented or when the image is segmented, the method 200 proceeds to 208 where features are extracted and feature descriptions are created. The features can be described through any of multiple methods for describing features. For example, when the features are extracted using a SIFT algorithm, the features are described using a unique feature descriptor that is produced by the algorithm. In at least one implementation, different characteristics of a segment can be calculated and compiled into a descriptor vector. When a descriptor vector is calculated, the processing unit 106 executes feature description instructions 116, which calculate different robust characteristics of a segment and store these different characteristics in a descriptor vector. Characteristics must be robust to enable feature matching between subsequent data frames by maintaining stable values. For example, FIG. 7 illustrates one implementation of feature descriptor vector in table 700. The feature descriptor vector shown in table 700 consists of 12 characteristics. The table 700 includes a feature number column 702 and a feature description column 704. The feature number column 702 shows the order of particular characteristics within a descriptor vector and the feature description column 704 describes different characteristics that form the descriptor vector.

As illustrated in FIG. 7, which is only illustrative of possible characteristics, the feature description instructions 116 direct the processing unit 106 to calculate 12 different characteristics for each segment. For example, at a first index in the descriptor vector, the processing unit 106 calculates and stores the distance from a segment center to the point of the maximum of residua multiplied by the average segment range. In at least one embodiment, the maximum of residua is the value along the border of the segment that has the highest residual calculation. At the second index, the processing unit calculates the value of the maximum of the residua within the segment. For the third index, the processing unit calculates the two-dimensional segment size multiplied by the square of the average segment range. For the fourth index, the processing unit 106 calculates the larger and smaller two-dimensional principal component analysis (PCA) eigenvalues. For the fifth index, the processing unit 106 calculates the 0.5+0.5 Sinus of the angle between the x-axis and maximum residua vector. For the seventh-ninth indices, the processing unit 106 calculates the square root of the smallest, medium, and largest eigenvalues of the three-dimensional PCA for a point cloud based on the x, y, and z coordinates. For the tenth-twelfth indices, the processing unit 106 calculates the square root of the smallest, medium, and largest eigenvalues of the three-dimensional PCA for a point cloud based on the range, residuum, and elevation. In certain implementations, the different descriptor vectors are scaled to a common scale to facilitate subsequent comparisons. The characteristics described in relation to FIG. 7 are only illustrative, other characteristics not described herein can be compared to one another using the methods described in this description.

When the descriptor vectors are calculated, the method 200 proceeds to 210, where feature matching and motion estimation are performed. For example, segment descriptions calculated from a segment map are compared against segment descriptions calculated from a different segment map, where the different segment maps were acquired at different times by the 3D data sensor 104. In at least one implementation, the processing unit 106 executes matching instructions 118 to compare segment descriptors identified in the different segment maps. In at least one embodiment, the processing unit 106 compares the different segment descriptors using a divergence between the different descriptors, or other mathematical operation that directly compares descriptor vectors for segments.

In certain implementations, when the processing unit 106 compares descriptor vectors for segments acquired from different frames, the processing unit 106 correlates the different descriptor vectors. In at least one exemplary implementation, the processing unit correlates a descriptor vector vecA from the first frame A and a descriptor vector vecB from a second frame B using the following equation:

$$r(vecA, vecB) = \frac{\text{cov}(vecA, vecB)}{\sqrt{\text{var}(vecA)\text{var}(vecB)}}.$$

When using the above correlation equation, the processing unit 106 determines that two segments in different frames correspond (match) to one another when r(vecA, vecB) is higher than a certain threshold. For example, a threshold can be equal to 0.8. In some implementations, the processing unit 106 further determines that two segments in different frames correspond to one another only if the two descriptor vectors vecA and vecB also satisfy the following condition:

$$r(vecA, vecB) = \max_{\forall vecC} r(vecA, vecC)$$
$$= \max_{\forall vecD} r(vecD, vecB).$$

The processing unit 106 determines that a segment in the first frame described by descriptor vector vecA corresponds to a segment in the second frame described by descriptor vector vecB when the correlation of descriptor vectors vecA and vecB yields a value that is equal to the maximum value produced by the correlation of descriptor vector vecA with all of the descriptor vectors that describe segments in the second frame and the correlation of descriptor vectors vecA and vecB yields a value that is equal to the maximum value produced by the correlation of descriptor vector vecB with all of the descriptor vectors that describe segments in the first frame.

In an alternative implementation, when the processing unit 106 compares descriptor vectors for segments acquired from different frames, the processing unit 106 calculates a sum of normalized differences, which is the sum of absolute values of the differences between the different characteristics in the descriptor vector with respect to the sum of absolute values of the characteristics. To calculate the sum of normalized differences, the processing unit may implement the following equation:

$$criteriaDiff(vecA, vecB) = \sum_{k=1}^{K} \frac{|vecA(k) - vecB(k)|}{|vecA(k)| + |vecB(k)|}.$$

In the equation above, the k is an index value representing an index in the descriptor vector and K refers to the number of different characteristics described in the descriptor vector. Also, when using the above sum of normalized differences equation, the processing unit 106 determines that two segments in different frames correspond to one another when criteriaDiff(vecA, vecB) is smaller than a certain threshold. In one embodiment, the threshold was equal to 0.1. In some implementations, the processing unit 106 further determines that two segments in different frames correspond to one another only if the two descriptor vectors vecA and vecB also satisfy the following condition:

$$criteriaDiff(vecA, vecB) = \min_{\forall vecC} criteriaDiff(vecA, vecC)$$
$$= \min_{\forall vecD} criteriaDiff(vecD, vecB)$$

The processing unit 106 determines that a segment in the first frame described by descriptor vector vecA corresponds to (matches) to a segment in the second frame described by descriptor vector vecB when the normalized difference between descriptor vectors vecA and vecB is equal to the minimum value for the normalized difference between descriptor vector vecA and all of the descriptor vectors that describe segments in the second frame and when the normalized difference between descriptor vectors vecA and vecB is equal to the minimum value for the normalized difference between descriptor vector vecB and all of the individual descriptor vectors that describe segments in the first frame.

Figure 8:
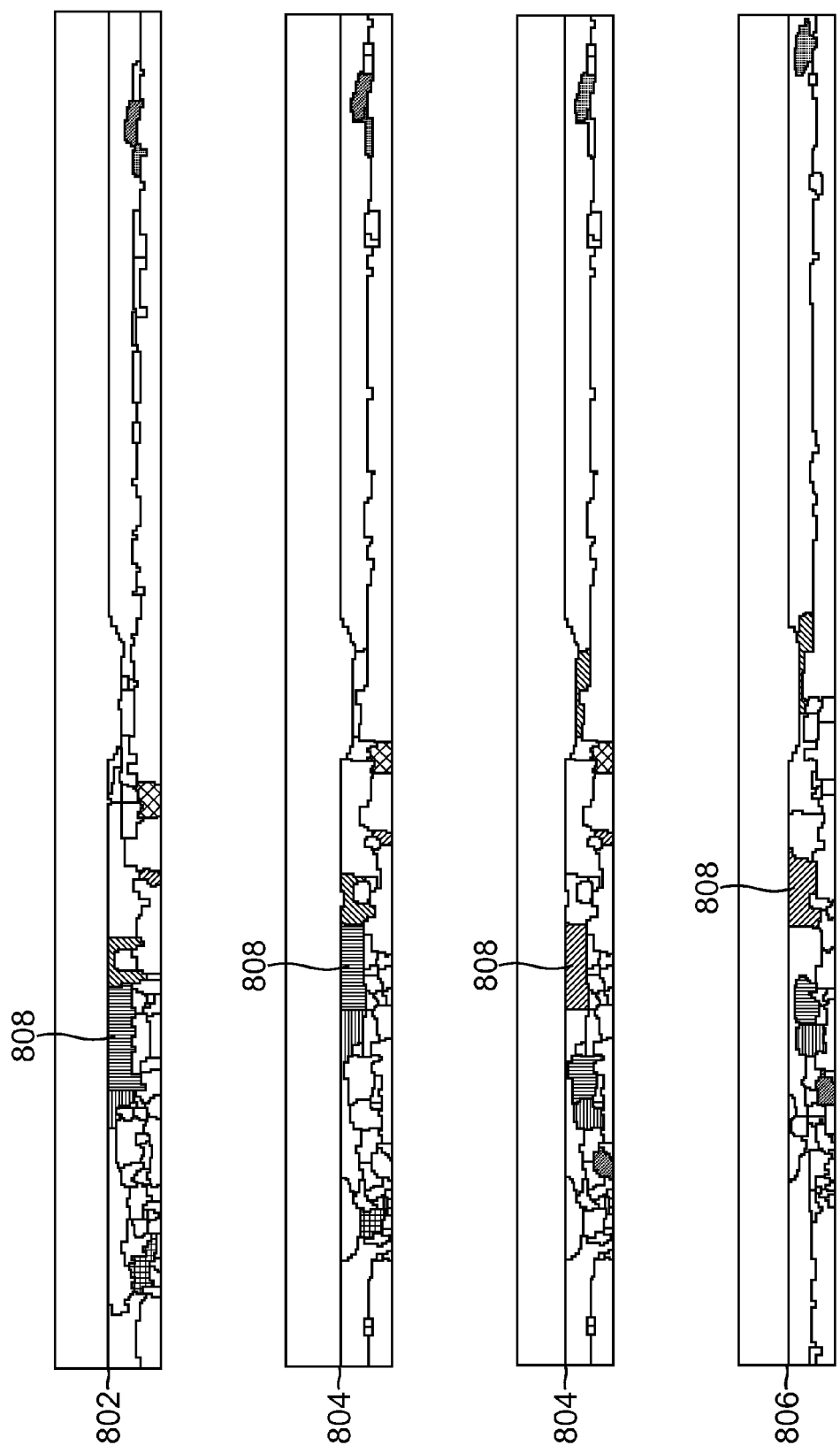
FIG. 8 is a diagram illustrating the comparison of segments identified in different residual maps in one embodiment described in the present disclosure.

FIG. 8 illustrates the comparison of three frames; a first frame 802, a second frame 804, and a third frame 806, where the first frame 802 was acquired first, the second frame 804 was acquired second, and the third frame 806 was acquired third. As illustrated in FIG. 8, the different frames have been segmented and descriptor vectors have been calculated for each segment. When different descriptors have been calculated for each segment, the processing unit 106 compares the descriptors against one another to determine changes in location and position for the different segments between the time instances in which the frames were captured. The processing unit 106 identifies segments in the first frame 802 that correspond to segments in the second frame 804. For example, as illustrated in FIG. 8, segment 808 is a segment that is found in the first frame 802 and the second frame 804. The processing unit 106 determines that the segment 808 is in both the first frame 802 and the second frame 804 by comparing all the descriptors against one another as described above. In one exemplary implementation, the processing unit 106 correlates the descriptor vectors of the different segments as described above. Alternatively, the processing unit 106 calculates a sum of normalized differences as described above to compare the descriptor vectors for the different segments in the first frame 802 and the second frame 804.

In certain embodiments, when the processing unit 106 has identified the corresponding segments (such as segment 808) between the first frame 802 and the second frame 804, the processing unit 106 determines position and orientation differences of the corresponding segments between the first frame 802 and the second frame 804. The processing unit 106, while further executing matching instructions 118, uses the position and orientation differences to calculate a navigation solution for the navigation system 100 or the vehicle containing the navigation system 100. In at least one implementation, the position and orientation differences of corresponding segments in different frames are used to provide updates to an estimated state estimation filter state. Further, the identified segments in the second frame 804 can be used to identify corresponding segments in a subsequently acquired third frame 806. Which third frame 806 also includes the corresponding segment 808. In a manner similar to the comparison of corresponding segments in the first frame 802 and the second frame 804, the position and orientation differences of corresponding segments in the second frame 804 and the third frame 806 can be used to calculate a navigation solution and/or provide updates to an estimated state estimation filter state.

As described above, the processing unit 106 is able to acquire data from a 3D data sensor 104. The processing unit 106 then uses the 3D data to calculate a navigation solution for a vehicle or other moving object. To calculate the navigation solution, the processing unit 106 rearranges, interpolates, and filters sensor measurements. The processing unit 106 then computes a residual map based on the interpolated and filtered sensor measurements. When the residual map is computed, the processing unit 106 may pre-process the residual map to prevent over segmentation in subsequent segmentation process or in feature extraction process. In at least one implementation, the processing unit 106 pre-processes the residual map using morphological reconstruction. From the residual map, the processing unit 106 segments the residual map. In at least one implementation, the processing unit 106 segments the residual map using a watershed algorithm. When the residual map is segmented, the processing unit 106 extracts features and computes different characteristics of the extracted features to aid in the description of the features. In some implementations, the processing unit 106 compiles the different characteristics in a descriptor vector. When the features are described, processing unit 106 attempts to find corresponding segments in different frames. When corresponding features are found, the processing unit 106 calculates the difference in position and orientation for the different frames and uses the information to calculate a navigation solution for the vehicle or individual.

Figure 9:
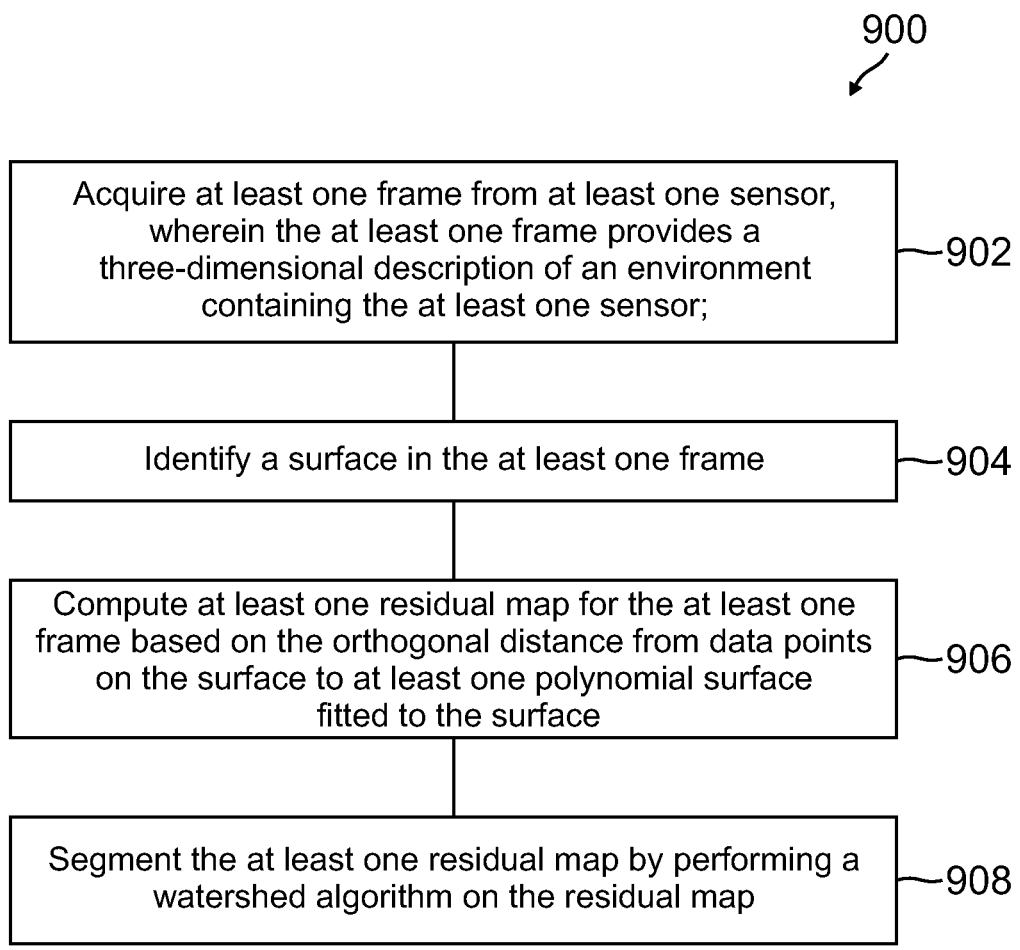
FIG. 9 is a flow diagram illustrating the segmentation of data acquired from a sensor in one embodiment described in the present disclosure.

FIG. 9 is a flow diagram illustrating a method 900 for segmenting data acquired from sensors. Method 900 proceeds at 902 where, at least one frame is acquired from at least one sensor, wherein the at least one frame provides a three-dimensional description of an environment containing the at least one sensor. For example, a LiDAR can gather a frame of data by performing a three dimensional scan of an environment. Method 900 proceeds to 904 where a surface is identified in the at least one frame. Due to the nature of existing sensors providing the 3D data, they generally provide a scan of the closest surface in the scene, thus it is reasonable to expect that data acquired from the 3D data sensor 104 forms a surface in 3D space. Method 900 then proceeds to 906, where at least one residual map is calculated for the at least one frame based on the orthogonal distances from data points on the surface to at least one plane fitted to the surface. In one implementation, a navigation computer fits a single plane to the surface before calculating the residual map. Alternatively, the navigation computer fits multiple planes in a piecewise fashion to the surface when calculating the residual map. In other implementations, the navigation computer may use higher order polynomial surfaces instead of planes or a single surface instead of a single plane. When the residual map is calculated, in some implementations, the at least one residual map is preprocessed by the morphological reconstruction methods. Method 900 then continues at block 908 by segmenting the residual map by performing a watershed algorithm.

Figure 10:
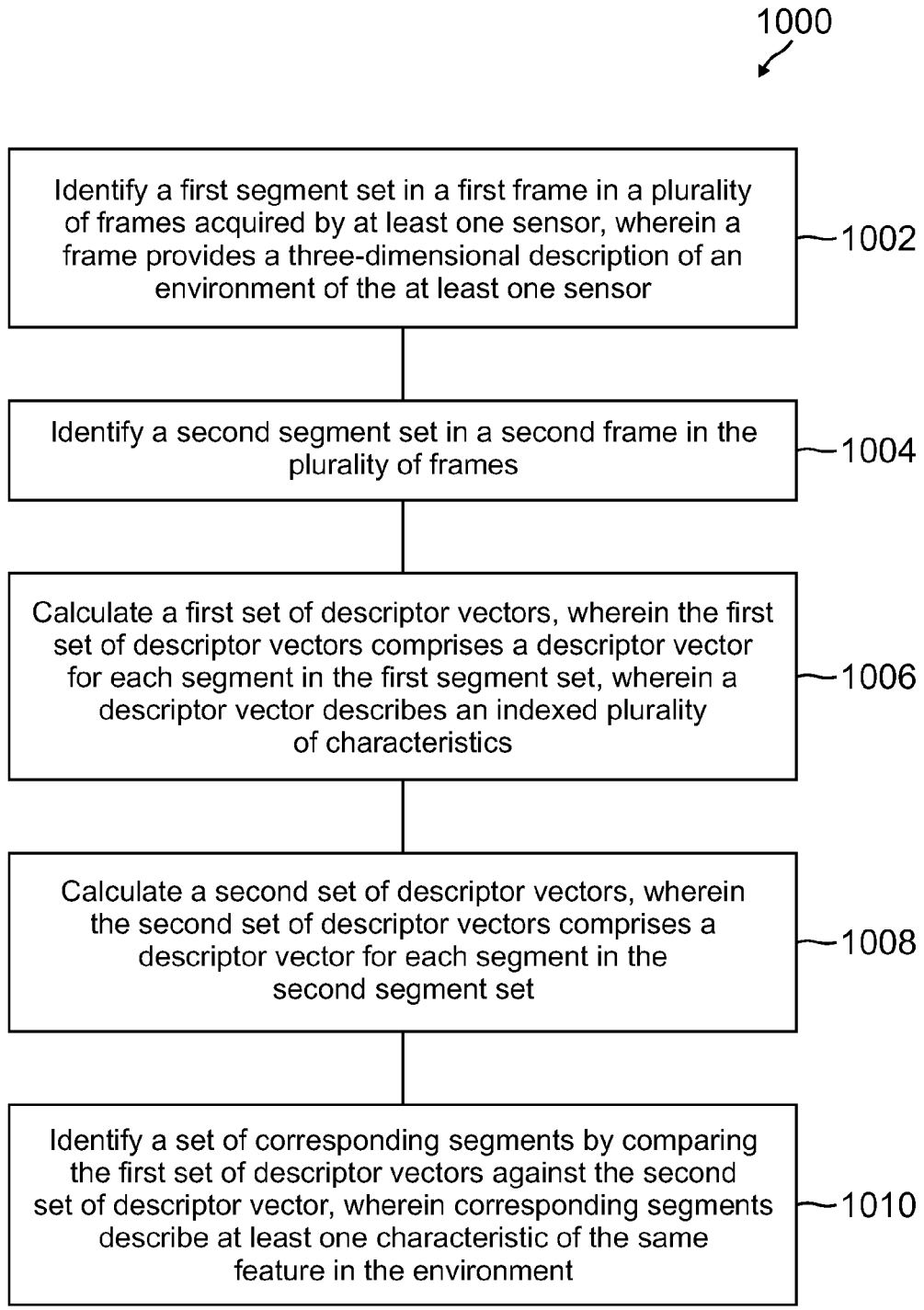
FIG. 10 is a flow diagram illustrating the identification of corresponding segments from different frames of data in one embodiment described in the present disclosure.

FIG. 10 is a flow diagram illustrating a method 1000 for identifying corresponding segments from different frames of data. Method 1000 proceeds at 1002 where a first segment set is identified in a first frame in a plurality of frames acquired by at least one sensor, wherein a frame provides a three-dimensional description of an environment of the at least one sensor. Method 1000 proceeds to 1004 where a second segment set is identified in a second frame in the plurality of frames. The identification of the first segment set and the second segment set in the respective first frame and second frame can be performed using the watershed algorithm as described above in relation to FIG. 9. Alternatively, other algorithms can be performed that segment the residual map, segment the frame of 3D data, or extract features from the frame of data to create the different segment sets.

Method 1000 proceeds to 1006 where a first set of descriptor vectors is calculated, wherein the first set of descriptor vectors comprises a descriptor vector for each segment in the first segment set, wherein a descriptor vector describes an indexed plurality of characteristics. Method 1000 proceeds to 1008 where a second set of descriptor vectors is calculated, wherein the second set of descriptor vectors comprises a descriptor vector for each segment in the second segment set. For example, the navigation computer calculates a series of characteristics for each segment in the first and second segment sets. The calculated characteristics are then indexed and placed in a vector. When the different descriptor vectors are calculated, method 1000 proceeds to 1010 where a set of corresponding segments is identified by comparing the first set of descriptor vectors against the second set of descriptor vectors, wherein corresponding segments describe at least one characteristic of the same feature in the environment. For example, the navigation computer compares the descriptor vectors associated with the first segment set against the descriptor vectors associated with the second segment set. Based on the comparison, the navigation computer can identify corresponding segments. The navigation computer can use differences in the position and orientation of the corresponding segments in relation to the sensor to calculate or update a navigation solution.

Example Embodiments

Example 1 includes a system for segmenting sensor data, the system comprising: at least one sensor configured to acquire at least one frame of data from an environment containing the at least one sensor, wherein the at least one frame provides a three-dimensional description of a portion of the environment; a processing unit configured to receive the at least one frame from the at least one sensor, wherein the processing unit is configured to segment the at least one frame by: computing a residual map that is based on the distance between data points in the at least one frame and at least one polynomial surface fitted to at least one surface represented by the data in the at least one frame; identifying a plurality of minima in the residual map, wherein each minimum in the plurality of minima is associated with a different region in a plurality of regions; flooding the residual map at the plurality of minima; identifying boundaries for the plurality of regions, wherein the boundaries are at the locations where the flooding in adjacent regions first contact one another as the residual map is flooded; and dividing the residual map into a plurality of segments based on the identified boundaries.

Example 2 includes the system of Example 1, wherein the processing unit is further configured to preprocess the at least one frame, wherein the preprocessing comprises data arrangement into a regular grid, interpolating and/or extrapolating, and filtering the at least one frame.

Example 3 includes the system of any of Examples 1-2, wherein computing the residual map further comprises calculating a residual value for each data point in the at least one frame, wherein the residual value is the sum of orthogonal distances between the at least one fitted polynomial surface and the data points within a specified local neighborhood.

Example 4 includes the system of any of Examples 1-3, wherein the processing unit is further configured to morphologically process the residual map.

Example 5 includes the system of Example 4, wherein the processing unit morphologically processes the residual map by performing at least one of: opening by reconstruction; and closing by reconstruction.

Example 6 includes the system of any of Examples 1-5, wherein the processing unit is further configured to: segment a first residual map from a first frame in the at least one frame; segment a second residual map from a second frame in the at least one frame; identify corresponding segments in the first residual map and the second residual map, wherein the corresponding segments describe a characteristic of the same feature in the environment; and determine differences between the corresponding segments including differences in mutual position and orientation.

Example 7 includes the system of Example 6, wherein the processing unit determines the motion of the at least one sensor through the environment based on the differences between corresponding segments.

Example 8 includes the system of Example 7, wherein the processing unit determines the motion of the at least one sensor to calculate a navigation solution for a navigation system.

Example 9 includes the system of any of Examples 1-8, wherein the processing unit merges at least two segments in the plurality of segments into a single segment based on characteristics of the at least two segments.

Example 10 includes the system of any of Examples 1-9, wherein the polynomial surface is a plane.

Example 11 includes the system of any of Examples 1-10, wherein the processing unit identifies the boundaries by identifying a plurality of points in the residual map that are associated with a plurality of maxima.

Example 12 includes a method for segmenting three-dimensional frames of data, the method comprising: acquiring at least one frame from at least one sensor, wherein the at least one frame provides a three-dimensional description of an environment containing the at least one sensor; identifying a surface in the at least one frame; computing at least one residual map for the at least one frame based on the orthogonal distance from data points on the surface to at least one polynomial surface fitted to the surface; and segmenting the at least one residual map by performing a watershed algorithm on the residual map.

Example 13 includes the method of Example 12, wherein the polynomial surface is a plane.

Example 14 includes the method of any of Examples 12-13, wherein segmenting the at least one residual map by performing the watershed algorithm comprises: identifying a plurality of minima in the at least one residual map, wherein each minimum in the plurality of minima is associated with a different region in a plurality of regions; flooding the at least one residual map at the plurality of minima; identifying boundaries for the plurality of regions, wherein the boundaries are at the locations where the flood in adjacent regions first contact one another as the at least one residual map is flooded; and dividing the at least one residual map into a plurality of segments based on the identified boundaries.

Example 15 includes the system of Example 14, further comprising merging at least two segments in the plurality of segments into a single segment based on characteristics of the at least two segments.

Example 16 includes the method of any of Examples 12-15, further comprising: pre-processing the at least one frame, wherein the pre-processing comprises arrangement into regular grid; interpolating; filtering the at least one frame; and morphologically processing the at least one residual map.

Example 17 includes the method of Example 16, wherein the morphological processing smoothes extrema of the at least one residual map through at least one of: an opening by reconstruction method; and a closing by reconstruction method.

Example 18 includes the method of any of Examples 12-17, further comprising: segmenting a first residual map in the at least one frame; segmenting a second residual map in the at least one frame; identifying corresponding segments in the first frame and the second frame, wherein the corresponding segments describe at least one characteristic of the same feature in the environment; and determining differences between the corresponding segments including differences in mutual position and orientation.

Example 19 includes the method of Example 18, further comprising determining motion of the at least one sensor through the environment based on the differences between the corresponding segments.

Example 20 includes a processor-readable medium comprising a plurality of instructions tangibly stored on a non-transitory storage medium, the instructions operable, when executed, to cause a processing unit to: acquire at least one frame from at least one sensor, wherein the at least one frame provides a three-dimensional description of an environment containing the at least one sensor; identify a surface represented by data in the at least one frame; compute at least one residual map for the at least one frame based on the orthogonal distance from data points on the surface to at least one plane fitted to the surface; identify a plurality of minima in the at least one residual map; flood the at least one residual map at the plurality of minima, wherein each minimum in the plurality of minima is associated with a different region in a plurality of regions; identify boundaries for the plurality of regions, wherein the boundaries are at the locations where the flood in adjacent regions first contact one another as the at least one residual map is flooded; and divide the at least one frame into a plurality of segments based on the identified boundaries.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system for segmenting sensor data for three-dimensional data based navigation using the watershed method, the system comprising:
at least one sensor configured to acquire at least one frame of range data from an environment containing the at least one sensor, wherein the at least one frame of range data provides a three-dimensional description of a portion of the environment;
a processing unit configured to receive the at least one frame of range data from the at least one sensor, wherein the processing unit is configured to segment the at least one frame of range data by:

computing a residual map that is based on the distance between data points in the at least one frame of range data and at least one polynomial surface fitted to at least one surface represented by the data in the at least one frame of range data, wherein the residual map represents, for each position of the at least one frame of range data, a residual value based on a distance between the at least one frame of range data and an interpolated polynomial surface representing a smoothed frame of range data, wherein the residual value is directly proportional to the local amount of discontinuity;

identifying a plurality of minima in the residual map, wherein each minimum in the plurality of minima is associated with a different region in a plurality of regions;

flooding the residual map at the plurality of minima;

identifying boundaries for the plurality of regions, wherein the boundaries are at the locations where the flooding in adjacent regions first contact one another as the residual map is flooded; and dividing the residual map into a plurality of segments based on the identified boundaries.

2. The system of claim 1, wherein the processing unit is further configured to preprocess the at least one frame of range data, wherein the preprocessing comprises data arrangement into a regular grid, interpolating and/or extrapolating, and filtering the at least one frame of range data.

3. The system of claim 1, wherein computing the residual map further comprises calculating the residual value for each data point in the at least one frame of range data, wherein the residual value is the sum of orthogonal distances between the at least one fitted polynomial surface and the data points within a specified local neighborhood.

4. The system of claim 1, wherein the processing unit is further configured to morphologically process the residual map.

5. The system of claim 4, wherein the processing unit morphologically processes the residual map by performing at least one of:

opening by reconstruction; and closing by reconstruction.

6. The system of claim 1, wherein the processing unit is further configured to:

segment a first residual map from a first frame of range data in the at least one frame of range data;

segment a second residual map from a second frame of range data in the at least one frame of range data;

identify corresponding segments in the first residual map and the second residual map, wherein the corresponding segments describe a characteristic of the same feature in the environment; and determine differences between the corresponding segments including differences in mutual position and orientation.

7. The system of claim 6, wherein the processing unit determines the motion of the at least one sensor through the environment based on the differences between corresponding segments.

8. The system of claim 7, wherein the processing unit determines the motion of the at least one sensor to calculate a navigation solution for a navigation system.

9. The system of claim 1, wherein the processing unit merges at least two segments in the plurality of segments into a single segment based on characteristics of the at least two segments.

10. The system of claim 1, wherein the polynomial surface is a plane.

11. The system of claim 1, wherein the processing unit identifies the boundaries by identifying a plurality of points in the residual map that are associated with a plurality of maxima.

12. A method for segmenting three-dimensional frames of range data for three-dimensional data based navigation using the watershed method, the method comprising:

acquiring at least one frame of range data from at least one sensor, wherein the at least one frame of range data provides a three-dimensional description of an environment containing the at least one sensor;

identifying a surface in the at least one frame of range data;

computing at least one residual map for the at least one frame of range data based on the orthogonal distance from data points on the surface to at least one polynomial surface fitted to the surface, wherein the residual map represents, for each position of the at least one frame of range data, a residual value based on a distance between the at least one frame of range data and an interpolated polynomial surface representing a smoothed of range data, wherein the residual value is directly proportional to the local amount of discontinuity;

identifying a plurality of minima in the at least one residual map, wherein each minimum in the plurality of minima is associated with a different region in a plurality of regions;

flooding the at least one residual map at the plurality of minima;

identifying boundaries for the plurality of regions, wherein the boundaries are at the locations where the flood in adjacent regions first contact one another as the at least one residual map is flooded; and dividing the at least one residual map into a plurality of segments based on the identified boundaries.

13. The method of claim 12, wherein the polynomial surface is a plane.

14. The system of claim 12, further comprising merging at least two segments in the plurality of segments into a single segment based on characteristics of the at least two segments.

15. The method of claim 12, further comprising:

pre-processing the at least one frame of range data, wherein the pre-processing comprises arrangement into regular grid;

interpolating;

filtering the at least one frame of range data; and morphologically processing the at least one residual map.

16. The method of claim 15, wherein the morphological processing smoothes extrema of the at least one residual map through at least one of:

an opening by reconstruction method; and a closing by reconstruction method.

17. The method of claim 12, further comprising:

segmenting a first residual map in the at least one frame of range data;

segmenting a second residual map in the at least one frame of range data;

identifying corresponding segments in the first frame of range data and the second frame of range data, wherein the corresponding segments describe at least one characteristic of the same feature in the environment; and determining differences between the corresponding segments including differences in mutual position and orientation.

18. The method of claim 17, further comprising determining motion of the at least one sensor through the environment based on the differences between the corresponding segments.

19. A processor-readable medium for three-dimensional data based navigation using the watershed method comprising a plurality of instructions tangibly stored on a non-transitory storage medium, the instructions operable, when executed, to cause a processing unit to:
- acquire at least one frame of range data from at least one sensor, wherein the at least one frame of range data provides a three-dimensional description of an environment containing the at least one sensor;
- identify a surface represented by data in the at least one frame of range data;
- compute at least one residual map for the at least one frame of range data based on the orthogonal distance from data points on the surface to at least one plane fitted to the surface, wherein the residual map represents, for each position of the at least one frame of range data, a residual value based on a distance between the at least one frame of range data and an interpolated polynomial surface representing a smoothed frame of range data, wherein the residual value is directly proportional to the local amount of discontinuity;
- identify a plurality of minima in the at least one residual map;
- flood the at least one residual map at the plurality of minima, wherein each minimum in the plurality of minima is associated with a different region in a plurality of regions;
- identify boundaries for the plurality of regions, wherein the boundaries are at the locations where the flood in adjacent regions first contact one another as the at least one residual map is flooded; and
- divide the at least one frame of range data into a plurality of segments based on the identified boundaries.

* * * * *